3,339,768
FLEXIBLE POWER-SUPPLY CONNECTIONS BETWEEN TELESCOPING MEMBERS
John David Dixon, Basingstoke, England, assignor to Lansing Bagnall Limited, Basingstoke, England, a British company
Filed Mar. 29, 1965, Ser. No. 443,468
Claims priority, application Great Britain, Apr. 1, 1964, 13,493/64
4 Claims. (Cl. 214—730)

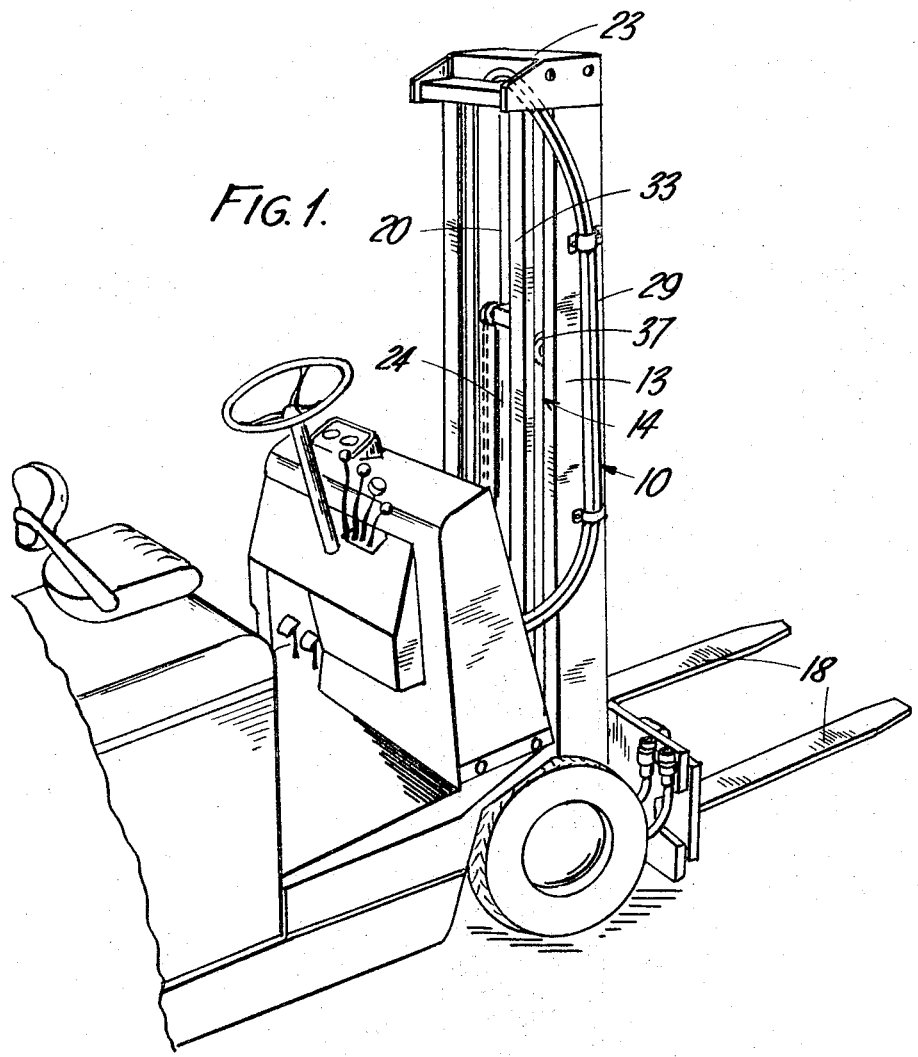

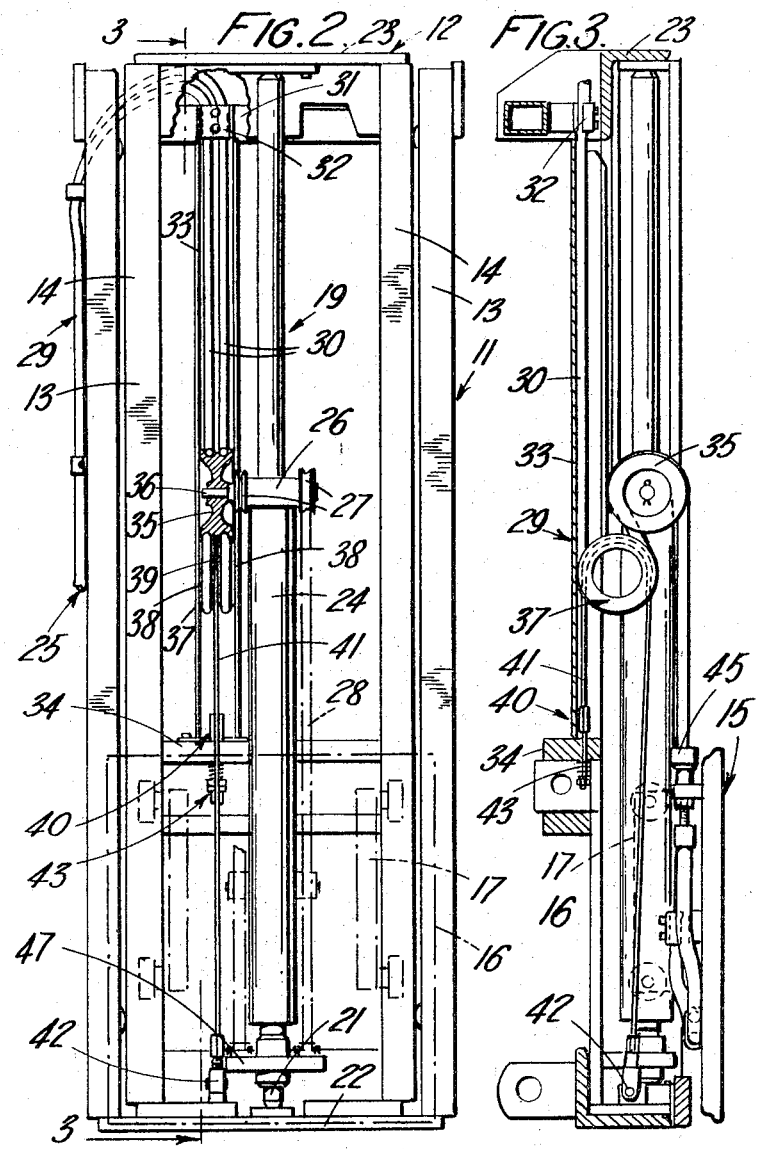

ABSTRACT OF THE DISCLOSURE

A load-lifting truck comprising, an extensible mast including pairs of uprights and a rising mast section, a load-bearing carriage movable up and down the rising mast section, a single continuous-length flexible power supply connection to the carriage which connection passes around pulleys located within the confines of the uprights of the mast sections and operable to pay out and take in the connection during movement of the carriage and the rising mast section, and a tensioning cable acting against movement of the pulleys and thereby holding the flexible connection taut.

---

This invention comprises improvements in or relating to flexible power-supply connections between telescoping members such as, for example, telescoping mast sections of an extensible mast on a load-lifting truck.

According to the invention, there is provided the combination comprising first and second telescoping members and a flexible power-supply connection between the members, or parts mounted thereon, wherein means are provided for paying out and taking in the flexible connection during extension and retraction of the members which means comprise a pulley located intermediately between the ends of the members and guided for movement relative to them in the direction of extension thereof, round which pulley the flexible connection is led in its path from the first member to the second member, and a tensioning cable which extends in the opposite direction round the pulley from the first to the second member.

There is also provided a load-lifting truck having the combination described in the preceding paragraph, wherein the first and second telescopic members consist respectively of first and second telescoping sections of an upright extensible mast having a load-bearing carriage mounted to run up and down the second mast section and wherein the flexible power-supply connection is connected between the upper end of the first mast section and the carriage, the connection being led in its path between the pulley and the carriage around means provided to take it in or pay it out during lifting or lowering of the carriage relatively to the second mast section.

In one form of such a truck, the carriage is raised and lowered relative to the second mast section by means of a chain which is secured to the carriage, extends upwards therefrom, passes round a guide on a hydraulic ram and thence extends downwards to an anchorage on the lower end of the second mast section or a part which moves in fixed relation with the second mast section and wherein the means to take in or pay out the flexible connection during raising or lowering of the carriage relatively to the second mast section comprise a pulley which is mounted on said ram and round which the flexible connection is led in its path between the pulley located intermediately the ends of the mast sections and the carriage. In one construction, the mast is extended by means of a hydraulic jack connected between the lower end of the first mast section and the upper end of the second mast section and said hydraulic ram is in the form of a sleeve slidable on the jack, the jack and ram being connected to the same source of hydraulic pressure fluid and being such that in operation the carriage is raised to the top of the second mast section before the mast is extended.

The pulley located intermediately between the ends of the mast sections may conveniently roll in an upright channel-shaped guide provided on the first or the second mast section. Preferably, the pulley is urged towards the guide by the cable.

By way of example, one construction in accordance with the invention will now be described with reference to the accompanying drawings in which:

FIGURE 1 is a perspective view of a load-lifting truck having the combination of the telescoping members and flexible power-supply connection attached thereto, FIGURE 2 is a front elevation of the said combination which is attached to the truck shown in FIGURE 1 and which is shown partly in section and with the fork carriage in chain lines, FIGURE 3 is a section along the line 3—3 in FIGURE 2.

With reference to the drawings a load-lifting truck is provided with an extensible mast 10 at its front end, which mast comprises a first upright mast section 11 mounted on the chassis of the truck and a second upright mast section 12 guided to move up-and-down on the first section.

The first section 11 comprises a pair of transversely-spaced parallel channel members 13 which are suitably braced together and are arranged so that the flanges of each member 13 project towards the other member 13 and the second mast section 12 is constructed in a similar manner, the channel member 14 of said second section being disposed between the channel members of the first section. The second mast section is guided for up and down movement by means of rollers (not shown) which rollers are mounted on it and run in the channels of the channel members 13 of the first section and by means of further rollers (not shown) mounted in those channels.

On the second mast section 12, a load-bearing carriage 15 is mounted to run up and down. The carriage comprises an upright back plate or framework 16 with brackets 17 projecting rearwardly between the channel members 14 of the second mast section and on the brackets there are rollers (not shown) which run in the channels of the second mast section to guide the carriage in up and down movement. On the back plate or frameork 16 there are load-engaging means such as, for example, forwardly projecting fork arms 18 (see FIGURE 1) mounted on a slide shifting attachment 46.

Disposed centrally between the channel members 13, 14 of the mast sections 11, 12, there is an inverted compound hydraulic jack 19 which is known per se. The jack comprises a cylinder 20 and ram 21 for extending the mast, the lower end of the ram being connected to a cross-bar at the lower end of the first mast section and the upper end of the cylinder being connected to a cross-bar 23 at the upper end of the second mast section, and a sleeve 24 which slides up and down on the cylinder 20 and acts as a further ram. The sleeve 24 is approximately half the length of the cylinder 20 so that when the jack 19 is in the collapsed state the upper end of the sleeve 24 is approximately mid-way between the upper and lower ends of the mast sections (see FIGURE 2). The jack 19 is connected to a source 25 of hydraulic pressure fluid and the effective piston areas of its parts are such that when fluid is supplied to it the sleeve 24 is moved upwards until the upper end thereof is at the upper end of the cylinder 20 before the cylinder is moved upwards on the ram 21.

Such features are shown in FIG. 5 of British Patent No. 966,123, Lansing Bagnall Limited.

On the upper end of the sleeve 24 there is a block 26 on which two chain pulleys 27 are rotatably mounted, one to one side of the jack and the other to the other side, and over each of which a chain 28 is led. The two chains 28 are each connected at one end to the load-bearing carriage 15 and at the other end to a bracket 47 on the lower end of the cylinder 20, which bracket moves in fixed relation to the second mast section 12. Thus, when the sleeve 24 of the jack 19 is moved upwards on the cylinder 20 the carriage 15 is caused by the chains 28 to rise at twice the rate of the sleeve 24 and when the block 26 is at the upper end of the cylinder 20, the carriage 15 will be at the top of the second mast section 12.

Between the body of the truck and the load-bearing carriage 15 there is a flexible power-supply connection 29, the carriage in this example, being provided with the side shifting attachment 46 which enables the forks 18 to be moved transversely on the carriage and that is operated by a hydraulic motor, such as a cylinder-and-ram, on the carriage. In this case the flexible power-supply connection will comprise flexible pipes for supplying hydraulic pressure fluid to the motor. It will be appreciated, however, that the connection could be on an electric cable to an electric motor on the carriage and that the particular form of the carriage, the particular form of motor thereon and the particular function which the motor performs are not important for an understanding of the invention. In this description, the flexible connection will be referred to as consisting of twin flexible hoses 30 leading to self-seating couplings 45 attached to the rear of the carriage 15, from which further hoses may, in use be connected to the side shifting attachment 46.

The twin hoses 30 are led from the source of pressure fluid 25 on the body of the truck to a cross-member 31 at the top of the first mast section 11 where they are held in place by a clip 32 or other suitable means and wherefrom they extend downwardly side by side in an upright channel-shaped guide 33 which extends between the top cross-member 31 and a cross-member 34 at the lower end of the first mast section. The guide is located rearwardly and to one side of the compound jack 19 and is arranged with its flanges projecting forwardly and, mounted on the block on the jack sleeve in line with the guide in a fore-and-aft direction, is a guide pulley 35 which is rotatable about the same transverse axis as the chain pulleys 27 on the block 26. The chain pulley 27 on the same side of the jack as the guide 33 may for example have a stub axle 36 projecting away from the block 26 on which axle the guide pulley 35 is rotatably mounted.

From the top cross-member 31 of the first mast section, the hoses 30 extend downwardly side by side in the guide 33, pass round a pulley 37 which is free to roll in the guide 33, extend upwards and pass round the guide pulley 35 on the block 26, and thence extend downwards to where they are connected to the load-bearing carriage 15. The length of the hoses between the top of the first mast section 11 and the carriage 15 is arranged so that when the carriage is at the bottom of the second mast section 12 (the mast being unextended) the pulley 37 in the guide 33 is just below the level of the guide pulley 35 on the block 26.

The pulley 37 in the guide 33 has a cylindrical surface round which the hoses 30 pass side by side and two annular flanges 38, one at each end, projecting radially outwards from the cylindrical surface. The radial length of each flange from its outer periphery to the cylindrical surface is less than the diameter of the hoses, however, with the result that the flanges 38 do not engage the web of the guide 33. Mid-way between its ends the cylindrical surface of the pulley has a circumferential groove 39 which will be referred to below.

At the lower end of the guide 33 on the first mast section there is an anchorage 40 to which one end of a tension cable 41 is secured, which cable extends upwards from the anchorage, passes round the pulley 37 in the circumferential groove 39 thereof, and thence extends downwards to a second anchorage 42 at the lower end of the second mast section 12 to which the other end of the cable 41 is secured. The first anchorage 40 is so located that the cable 41 extends substantially vertically upwards to the pulley 37, but the second anchorage 42 is so located on the second mast section 12 that the spacing between the two vertical transverse planes containing the anchorage 40, 42 is less than the diameter of the pulley 37 at its circumferential groove 39. As a result, from the pulley 37, to the second anchorage 42 the cable 41 extends not only downwards but also rearwards towards the plane of the guide 33 and this has the effect of urging the pulley 37 towards the web of the guide 33. The anchorage 40 on the first mast section is preferably adjustable up and down to allow adjustment of the tension of the cable should this be necessary from time to time. In this example, a spring-loaded tensioning device 43 is provided.

In operation, when the load-bearing carriage 15 is raised on the second mast section 12, the hoses 30 are taken in between the pulley 37 in the guide 33 and the carriage as a result of the upward movement of the guide pulley 35 on the block 26 on the jack sleeves 24. The pulley 37 in the guide 33 remains stationary, however, owing to the tensioning cable 41 restraining it against upward movement. On subsequent extension of the second mast section 12, the tensioning cable 41 is paid out owing to the second anchorage 42 rising and thereby allows the hoses 30 to be paid out, while remaining tensioned by the cable 41, to an extent corresponding to the movement of the second mast section. Thus during extension of the second mast section, the pulley 37 in the guide 33 rolls upwards at half the rate at which the second mast section rises. When the second mast section is lowered, the pulley 37 in the guide 33 is pulled down by the cable 41 and the hoses 30 are thereby automatically taken in correspondingly.

Because, as stated above, the flanges 38 of the pulley 37 in the guide 33 do not engage the web of the guide, the hoses 30 are trapped between the cylindrical surface of the pulley 37 and the web of the guide 33 at all positions of the pulley 37 up and down the guide. If the hoses 30 are of relatively small diameter, however, it may be preferable to arrange that the radial length of each flange 38, from its outer periphery to the cylindrical surface of the pulley, is greater than the diameter of the hoses so that the flanges engage the web of the guide and the hoses are not trapped between the cylindrical surface of the pulley and the web of the guide.

Although the flexible power-supply connection 29 has been described as consisting of twin hoses 30, it will be appreciated that further power-supply connections, for example another pair of hoses, may also be led in the same path from the first mast section 11 to the carriage 15. To allow this, the pulley 37 in the guide 33 may have a longer cylindrical surface in which case a further tensioning cable 41 is preferably provided. Alternatively, there may also be provided for such further connections a corresponding guide on the other side of the compound jack, a corresponding guide pulley on the block on the jack sleeve, a corresponding pulley in the guide and a corresponding tensioning cable.

I claim:
1. A load-lifting truck having an upright extensible mast comprising first and second telescoping sections, each section comprising a pair of spaced apart uprights, a load bearing carriage mounted for up and down movement on the second mast section, a flexible power supply connection which is a single continuous length and which extends between anchor points on the first mast section and on the carriage, ram means located between the uprights of the mast sections for raising or lowering the carriage relatively to the second mast section and for raising or lowering the second mast section relatively to the first mast section, a first pulley for paying out and taking in the flexible connection during said movement of the carriage, which first pulley is located between the ends and within the confines of the mast sections and is mountd on the said ram and round which first pulley the flexible connection is led in its path from the first mast section to the carriage, a second pulley for paying out and taking in the flexible connection during raising or lowering of the second mast section, which second pulley is located between the ends and within the confines of the mast sections and is located below and in alignment with the first pulley and round which second pulley the flexible connection is led in its path from the first mast section to the first pulley, and a tensioning cable which extends in the opposite direction round the second pulley from the first mast section to the second mast section.

2. A truck as claimed in claim 1 in which the ram means for raising or lowering the second mast section comprise a hydraulic jack connected between the lower end of the first mast section and the upper end of the second mast section and the said hydraulic ram is in the form of a sleeve slidable on the jack, the jack and ram being connected to the same source of hydraulic pressure fluid and being such that in operation the carriage is raised to the top of the second mast section before the mast is raised.

3. A truck as claimed in claim 1 in which an upright channel-shaped guide is provided between and in fixed relation to the uprights of the first mast section, up and down which guide rolls the second pulley during raising and lowering of the second mast section.

4. A truck as claimed in claim 3 in which the second pulley is urged towards said guide by the tensioning cable.

References Cited

UNITED STATES PATENTS

| | | | |
|---|---|---|---|
| 2,622,751 | 12/1952 | Shaffer | 214—653 |
| 2,932,419 | 4/1960 | Harris | 214—652 |
| 3,166,208 | 1/1965 | Quayle | 214—653 X |

GERALD M. FORLENZA, *Primary Examiner.*

F. WERNER, *Assistant Examiner.*